(12) United States Patent
Wang

(10) Patent No.: US 9,781,413 B2
(45) Date of Patent: Oct. 3, 2017

(54) SIGNALING OF LAYER IDENTIFIERS FOR OPERATION POINTS

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 14/042,416

(22) Filed: Sep. 30, 2013

(65) Prior Publication Data

US 2014/0092996 A1    Apr. 3, 2014

Related U.S. Application Data

(60) Provisional application No. 61/709,094, filed on Oct. 2, 2012.

(51) Int. Cl.
| | |
|---|---|
| H04N 7/26 | (2006.01) |
| H04N 19/46 | (2014.01) |
| H04N 19/70 | (2014.01) |
| H04N 19/30 | (2014.01) |

(52) U.S. Cl.
CPC ....... *H04N 19/00545* (2013.01); *H04N 19/30* (2014.11); *H04N 19/46* (2014.11); *H04N 19/70* (2014.11)

(58) Field of Classification Search
CPC .. H04N 19/00545; H04N 19/70; H04N 19/46; H04N 19/30; H04N 7/26; H04N 7/12

USPC ...................................................... 375/240.26
See application file for complete search history.

(56) References Cited

U.S. PATENT DOCUMENTS

| | | | |
|---|---|---|---|
| 6,993,201 B1* | 1/2006 | Haskell ............... | H04N 19/187 375/240.08 |
| 8,411,746 B2 | 4/2013 | Chen et al. | |
| 2009/0323824 A1 | 12/2009 | Pandit et al. | |
| 2010/0250763 A1 | 9/2010 | Bouazizi | |
| 2011/0032999 A1 | 2/2011 | Chen et al. | |
| 2012/0036544 A1 | 2/2012 | Chen et al. | |
| 2012/0089740 A1 | 4/2012 | Yin et al. | |
| 2012/0183077 A1* | 7/2012 | Hong ..................... | H04N 19/70 375/240.25 |
| 2014/0168362 A1* | 6/2014 | Hannuksela ....... | H04N 13/0048 348/43 |

OTHER PUBLICATIONS

Second Written Opinion from International Application No. PCT/US2013/062890, dated Oct. 20, 2014, 7 pp.
International Preliminary Report on Patentability from International Application No. PCT/US2013/062890, dated Feb. 6, 2015, 6 pp.

(Continued)

*Primary Examiner* — Andy Rao
*Assistant Examiner* — Zaihan Jiang
(74) *Attorney, Agent, or Firm* — Shumaker & Sieffert, P.A.

(57) ABSTRACT

A device for processing video data receives an indication of a maximum layer identification (ID) value for a bitstream; receives a flag for a first layer with a layer ID value less than the maximum layer ID value; and, based on a value of the flag, determines if the first layer is included in an operation point.

43 Claims, 6 Drawing Sheets

(56) References Cited

OTHER PUBLICATIONS

Boyce "VPS syntax for scalable and 3D extensions" JCT-VC Meeting; MPEG Meeting; Shanghai; (Joint Collaborative Team on Video Coding of ISO/IEC JTC1/SC29/WG11 and ITU-T SG.16), No. JCTVC-K0204, Oct. 10-19, 2012, XP030113086, 6 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.

International Search Report and Written Opinion—PCT/US2013/062890, International Search Authority—European Patent Office, Dec. 12, 2013, 10 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Schierl et al: "Mobile Video Transmission Using Scalable Video Coding" IEEE Transactions on Circuits and Systems for Video Technology, IEEE Service Center, Piscataway, NJ, US LNKDDOI: 10.1109/TCSVT.2007.905528, vol. 17, No. 9, Sep. 1, 2007, pp. 1204-1217, XP011193018.
Wang et al., "AHG9: On video parameter set," JCT-VC Meeting; MPEG Meeting; Oct. 10-19, 2012; Shanghai; (Joint Collaborative Team on Video Coding of ISO/IEC JTC1/SC29/WG11 and ITU-T SG.16); URL: http://wftp3.itu.int/av-arch/jctvc-site/,, No. JCTVC-K0125, XP030113007, 7 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.

* cited by examiner

SIGNALING OF LAYER IDENTIFIERS FOR OPERATION POINTS

This application claims the benefit of U.S. Provisional Patent Application No. 61/709,094, filed 2 Oct. 2012, the entire content of which is incorporated herein by reference.

TECHNICAL FIELD

This disclosure generally relates to processing video data and, more particularly, processing operation points used in video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for signaling layer identifiers for operation points in video coding.

In one example, a method of processing video data includes receiving an indication of a maximum layer identification (ID) value for a bitstream; receiving a flag for a first layer with a layer ID value less than the maximum layer ID value; and, based on a value of the flag, determining if the first layer is included in an operation point.

In another example, a device for processing video data includes one or more processors configured to receive an indication of a maximum layer identification (ID) value for a bitstream; receive a flag for a first layer with a layer ID value less than the maximum layer ID value; and, based on a value of the flag, determine if the first layer is included in an operation point.

In another example, an apparatus for processing video data includes means for receiving an indication of a maximum layer identification (ID) value for a bitstream; means for receiving a flag for a first layer with a layer ID value less than the maximum layer ID value; and, means for determining if the first layer is included in an operation point based on a value of the flag.

In another example, a non-transitory, computer readable storage medium stores instructions that when executed by one or more processors cause the one or more processors to receive an indication of a maximum layer identification (ID) value for a bitstream; receive a flag for a first layer with a layer ID value less than the maximum layer ID value; and, based on a value of the flag, determine if the first layer is included in an operation point.

In another example, a method of encoding video data includes generating an indication of a maximum layer identification (ID) value for a bitstream; and, generating a flag for a first layer with a layer ID value less than the maximum layer ID value, wherein a value for the flag signals if the first layer is included in an operation point.

In another example, a video coding device includes a video encoder configured to generate an indication of a maximum layer identification (ID) value for a bitstream; and, generate a flag for a first layer with a layer ID value less than the maximum layer ID value, wherein a value for the flag signals if the first layer is included in an operation point.

In another example, an apparatus for video coding includes means for generating an indication of a maximum layer identification (ID) value for a bitstream and means for generating a flag for a first layer with a layer ID value less than the maximum layer ID value, wherein a value for the flag signals if the first layer is included in an operation point.

In another example, a non-transitory, computer-readable medium stores instructions that when executed by one or more processors cause the one or more processors to generate an indication of a maximum layer identification (ID) value for a bitstream and generate a flag for a first layer with a layer ID value less than the maximum layer ID value, wherein a value for the flag signals if the first layer is included in an operation point.

The details of one or more examples are set forth in the accompanying drawings and the description below. Other features, objects, and advantages will be apparent from the description and drawings, and from the claims.

DETAILED DESCRIPTION

Figure 1:
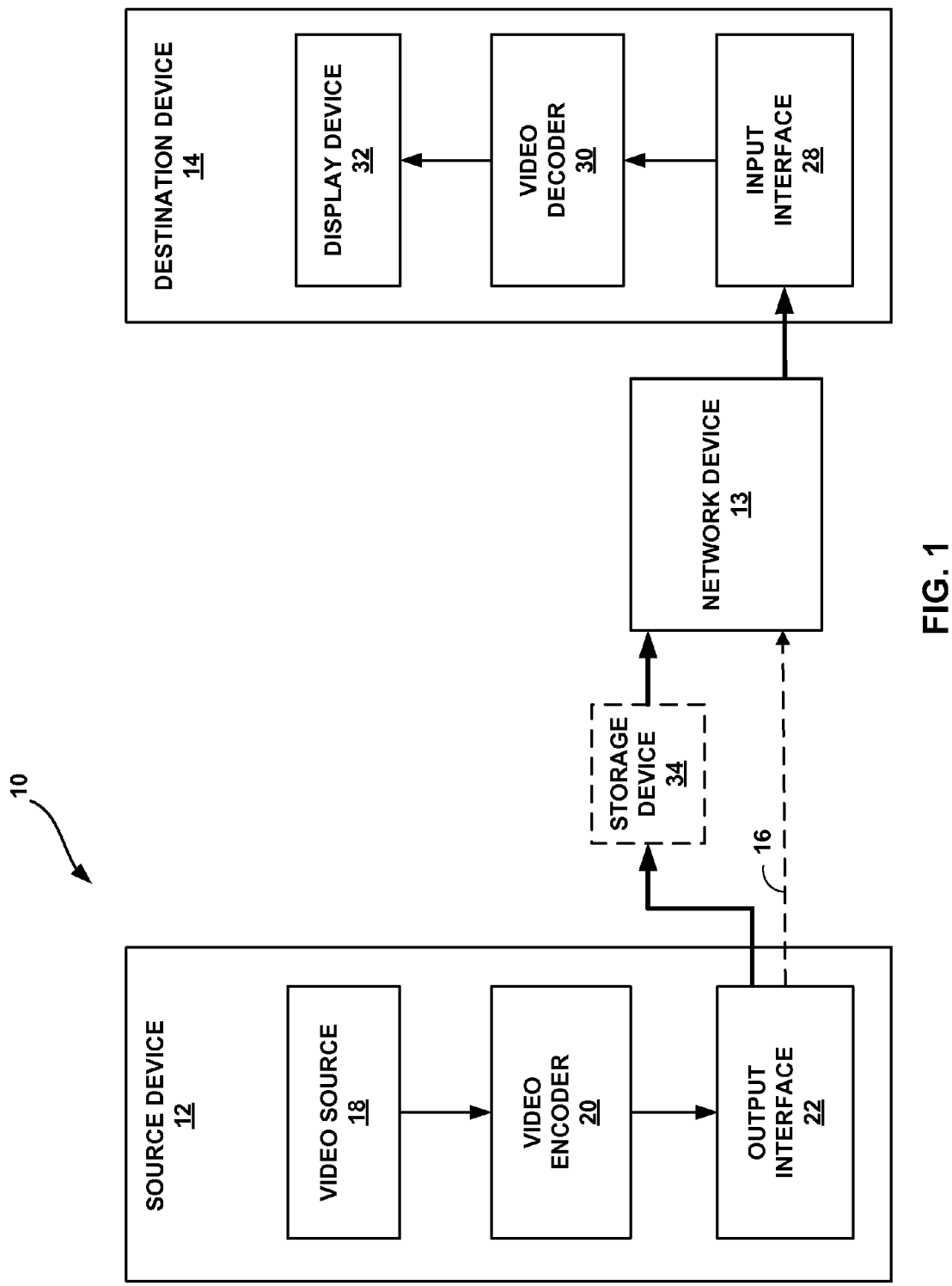
FIG. 1 is a block diagram illustrating an example video encoding and decoding system that may utilize the techniques described in this disclosure.

This disclosure relates to video coding (i.e. encoding and/or decoding of video data) and video processing, and more particularly to operation point syntax used in video processing. In general, this disclosure describes techniques for signaling layer identifiers for operation points in video coding. Operation points refer to sub-bitstreams that may be extracted from an original bitstream that is scalable temporally and/or with multiple layers or views. The sub-bitstreams may be extracted from the bitstream based on values of layer identifiers (i.e. layer IDs) and temporal sub-layer identifiers (i.e. temporal IDs) that identify the operation point of the bitstream. Generally, this disclosure uses the terms layer identifiers and layer IDs to refer to identifiers of spatial layers and/or views, while the terms temporal sub-layer identifiers and temporal IDs refer to identifiers of temporal sub-layers.

Operation points may, for example, be signaled in a parameter set, such as a video parameter set (VPS), within the bitstream. For each of the operation points, an operation point syntax structure, generated by a video encoder, for example, specifies a set of layer identifiers used to identify network abstraction layer (NAL) units in the bitstream that belong to a sub-bitstream of a given operation point. In this way, a network entity, such as a media aware network entity (MANE), may parse NAL unit headers to extract from the original bitstream the NAL units that make up the sub-bitstream of the given operation point. Each NAL unit in the bitstream may include a layer ID and a temporal ID and by parsing the layer ID and the temporal ID, the MANE may identify the NAL units for a particular operation point.

The techniques of this disclosure may improve the efficiency of signaling information associated with the operation points by improving the signaling of layer IDs for operation points. According to one example technique of this disclosure that will be explained in greater detail below, a layer identification value (i.e. a layer ID) for the greatest layer ID can be signaled, and the presence of additional layer IDs can be signaled as a series of flags. For example, assume a bitstream includes six substreams of various temporal and spatial resolutions, with each substream having a layer ID. The greatest layer ID value can be signaled in the bitstream. For purposes of this example, assume the greatest layer ID value is 9, meaning there are potentially ten layers, with layer IDs 0 to 9, that can be included in an operation point. The remaining layer ID values for the operation point can be signaled using nine flags, where a first flag indicates if layer ID value 0 is present, the second flag indicates if layer ID value 1 is present, and so on, up to a final flag that indicates if layer ID value 8 is present. Thus, to signal layer ID values 2, 5, and 9, the value 9 can first be signaled followed by the sequences of flags 001001000, where the 1 for the third bit indicates layer ID value 2 is present and the 1 for the sixth bit indicates layer ID value 5 is present. Other techniques for signaling layer IDs will also be discussed in this disclosure.

This disclosure will generally use the term video coding to refer to either video encoding or video decoding. This disclosure also uses the term video processing, which is generally meant to include video coding but also to include other types of video processing, such as video data parsing, video data routing, video bitstream splicing, and other such processes. A video coder may generally be considered to refer to a device that encodes and/or decodes video data, while a video processor or video processing device may be considered to refer to a device that codes video data but also to a device that performs other processes on video data.

FIG. 1 is a block diagram illustrating an example video encoding and decoding system 10 that may utilize the techniques for signaling layer IDs described in this disclosure. As shown in FIG. 1, system 10 includes a source device 12 that generates encoded video data to be decoded at a later time by a destination device 14. The encoded video data may be routed from source device 12 to destination device 14 via network device 13, which may be part of a larger network of network devices. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

In the example of FIG. 1, source device 12 includes video source 18, video encoder 20, and output interface 22. Destination device 14 includes input interface 28, video decoder 30, and display device 32. In other examples, source device 12 and destination device 14 may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques of this disclosure may be performed by any digital video coding and/or processing device. Although generally the techniques are performed by a video encoding device or a video decoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

In one example, video encoder 20 of source device 12 may generate a bitstream of video data. A VPS for the video data may define multiple operation points corresponding to sub-bitstreams of the bitstream. Video encoder 20 may include operation point syntax identifying the layers and temporal sub-layers to be included in particular operations points. The operation point syntax in the VPS may include an indication of a maximum layer ID value for an operation point as well as one or more flags. The flags indicate if the layers with layer IDs less than the maximum layer ID are included in the operation point. Thus, upon receiving the VPS with the maximum layer ID and the flags, network device 13 can identify the NAL units for the operation point and route those NAL units to destination device 14. Upon receiving the NAL units, video decoder 30 of destination device 14 can decoded the encoded video data. Video decoder 30 may potentially parse the operation point syntax contained in the VPS in the same manner as network device 13. For example, video decoder 30 may parse the operation point syntax to check whether all the expected layers are received or to determine set of hypothetical reference decoder (HRD) parameters to apply.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications.

In each case, the captured, pre-captured, or computer-generated video may be encoded by video encoder 20. The encoded video data may be transmitted directly to destination device 14 via output interface 22 of source device 12. The encoded video data may also (or alternatively) be stored onto a storage device for later access by destination device 14 or other devices, for decoding and/or playback.

Link 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, link 16 may be understood to include one or more computer-readable media of various forms, in various examples. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Input interface 28 of destination device 14 receives information from link 16, which may be a computer-readable medium. The information from link 16 may include syntax information defined by video encoder 20, which is also used by video decoder 30, that includes syntax elements that describe characteristics and/or processing of blocks and other coded units, e.g., GOPs. Display device 32 may be integrated with, or external to, destination device 14. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

Video encoder 20 and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

A device including video encoder 20 and/or video decoder 30 may comprise an integrated circuit, a microprocessor, and/or a wireless communication device, such as a cellular telephone.

Video encoder 20 and video decoder 30 may operate according to a video coding standard, such as the HEVC standard presently under development, and may conform to the HEVC Test Model (HM). A draft of the upcoming HEVC standard, referred to as "HEVC Working Draft 8" or "WD8," is described in document JCTVC-J1003_d7, Bross et al., "High efficiency video coding (HEVC) text specification draft 8," Joint Collaborative Team on Video Coding (JCT-VC) of ITU-T SG16 WP3 and ISO/IEC JTC1/SC29/WG11, 10th Meeting: Stockholm, Sweden, July, 2012. Working draft 8 of the HEVC standard is hereby incorporated by reference in its entirety. Another recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013. WD10 is hereby incorporated by reference in its entirety.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. In some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

HEVC is designed to be generic in the sense that it is intended to serve, e.g. be compatible with, a wide range of applications, bit rates, resolutions, qualities, and services. Applications potentially served by HEVC include, among other things, digital storage media, television broadcasting and real-time communications. In the course of creating HEVC, various requirements from typical applications have been considered, necessary algorithmic elements have been developed, and these have been integrated into a single syntax. Hence, HEVC should facilitate video data interchange among different applications. Considering the practicality of implementing the full syntax of HEVC, however, a limited number of subsets of the syntax are also stipulated by means of "profiles" and "levels."

A "profile" is defined as a subset of the entire bitstream syntax that is specified by HEVC. Within the bounds imposed by the syntax of a given profile it is still possible to require a very large variation in the performance of encoders and decoders depending upon the values taken by syntax elements in the bitstream such as the specified size of the decoded pictures. In many applications, it is currently neither practical nor economic to implement a decoder capable of dealing with all hypothetical uses of the syntax within a particular profile.

In order to deal with this problem, "tiers" and "levels" may be specified within each profile. A level of a tier is a specified set of constraints imposed on values of the syntax elements in the bitstream. These constraints may be simple limits on values. Alternatively, they may take the form of constraints on arithmetic combinations of values (e.g., picture width multiplied by picture height multiplied by number of pictures decoded per second). A level specified for a lower tier is more constrained than a level specified for a higher tier. The same set of levels is defined for all profiles, with most aspects of the definition of each level being in common across different profiles. Individual implementations may, within specified constraints, support a different level for each supported profile. In a different context, level is the value of a transform coefficient prior to scaling. Profiles and levels are described in more detail in Annex A of High Efficiency Video Coding (HEVC) Working Draft 8 (WD8).

Coded video content conforming to HEVC WD8 uses a common syntax. In order to achieve a subset of the complete syntax, flags, parameters, and other syntax elements are included in the bitstream that signal the presence or absence of syntactic elements that occur later in the bitstream.

HEVC WD8 defines a sub-layer as a temporal scalable layer of a temporal scalable bitstream consisting of video coding layer (VCL) network abstraction layer (NAL) units with a particular value of the TemporalId variable, and the associated non-VCL NAL units. HEVC WD8 further defines a sub-layer representation as a subset of the bitstream consisting of NAL units of a particular sub-layer and the lower sub-layers.

Subclause 10.1 of HEVC 8 describes bitstream subsets and an extraction process to generate sub-bitstreams. Subclause 10.1 is set forth below.

10.1 Sub-Bitstream Extraction Process

It is requirement of bitstream conformance that any sub-bitstream that is included in the output of the process specified in this subclause with tIdTarget equal to any value in the range of 0 to 6, inclusive, and with targetDecLayerIdSet containing the value 0 shall be conforming to this Recommendation|International Standard.

NOTE—A conforming bitstream contains one or more coded slice NAL units with nuh_reserved_zero_6bits equal to 0 and TemporalId equal to 0.

Inputs to this process are a variable tIdTarget and a list targetDecLayerIdSet.

Output of this process is a sub-bitstream.

The sub-bitstream is derived by removing from the bitstream all NAL units with TemporalId greater than tIdTarget or nuh_reserved_zero_6bits not among the values in targetDecLayerIdSet.

In general, HEVC WD8 describes extracting sub-bitstreams from the bitstream based on values of layer identifiers and temporal sub-layer identifiers that identify an operation point of the bitstream.

An operation point is generally identified by a set of nuh_reserved_zero_6bits values, denoted as OpLayerIdSet, and a TemporalId value, denoted as OpTid, and the associated bitstream subset derived as the output of the sub-bitstream extraction process as specified in subclause 10.1 of HEVC WD8 with OpTid and OpLayerIdSet as inputs is independently decodable. A simple operation point mode is generally considered to be an operation point mode in which for each operation point the OpLayerIdSet includes and only includes a particular value of nuh_reserved_zero_6bits and all other values of nuh_reserved_zero_6bits less than the particular value of nuh_reserved_zero_6bits.

Table 1 below shows an example of VPS raw byte sequence payload (RBSP) syntax and semantics.

TABLE 1

| video_parameter_set_rbsp( ) { | Descriptor |
|---|---|
| video_parameter_set_id | u(4) |
| vps_temporal_id_nesting_flag | u(1) |
| vps_reserved_zero_2bits | u(2) |
| vps_reserved_zero_6bits | u(6) |
| vps_max_sub_layers_minus1 | u(3) |
| profile_tier_level( 1, vps_max_sub_layers_minus1 ) | |
| vps_reserved_zero_12bits | u(12) |
| for( i = 0; i <= vps_max_sub_layers_minus1; i++ ) { | |
|   vps_max_dec_pic_buffering[ i ] | ue(v) |
|   vps_max_num_reorder_pics[ i ] | ue(v) |
|   vps_max_latency_increase[ i ] | ue(v) |
| } | |
| vps_num_hrd_parameters | ue(v) |
| for( i = 0; i < vps_num_hrd_parameters; i++ ) { | |
|   vps_simple_op_mode_flag[ i ] | u(1) |

TABLE 1-continued

| video_parameter_set_rbsp( ) { | Descriptor |
|---|---|
|     if( i > 0 ) | |
|       operation_point( i ) | |
|     hrd_parameters( i = = 0, | |
|     vps_max_sub_layers_minus1 ) | |
|   } | |
|   vps_extension_flag | u(1) |
|   if( vps_extension_flag ) | |
|     while( more_rbsp_data( ) ) | |
|       vps_extension_data_flag | u(1) |
|   } | |
|   rbsp_trailing_bits( ) | |
| } | |

The syntax element "vps_simple_op_mode_flag[i]" set equal to 1 specifies that the simple operation point mode is in use for the i-th operation_point_layer_ids( ) syntax structure. The syntax element "vps_simple_op_mode_flag[i]" equal to 0 specifies that the simple operation point mode is not in use for the i-th operation_point( ) syntax structure.

Any two instances of the syntax structure hrd_parameters (i, vps_max_sub_layers_minus1) and hrd_parameters(j, vps_max_sub_layers_minus1), where i is not equal to j, may not have the same content.

Table 2 below shows an example of profile, tier and level syntax and semantics.

TABLE 2

| profile_tier_level( ProfilePresentFlag, MaxNumSubLayersMinus1 ) { | Descriptor |
|---|---|
|   if( ProfilePresentFlag ) { | |
|     general_profile_space | u(2) |
|     general_tier_flag | u(1) |
|     general_profile_idc | u(5) |
|     for( i = 0; i < 32; i++ ) | |
|       general_profile_compatibility_flag[ i ] | u(1) |
|     general_reserved_zero_16bits [Ed. (GJS): Adjust semantics accordingly.] | u(16) |
|   } | |
|   general_level_idc | u(8) |
|   for( i = 0; i < MaxNumSubLayersMinus1; i++ ) { | |
|     if( ProfilePresentFlag ) | |
|       sub_layer_profile_present_flag[ i ] | u(1) |
|     sub_layer_level_present_flag[ i ] | u(1) |
|     if( sub_layer_profile_present_flag[ i ] ) | |
|       sub_layer_profile_idc[ i ] | u(5) |
|     if( sub_layer_level_present_flag[ i ] ) | |
|       sub_layer_level_idc[ i ] | u(8) |
|   } | |
| } | |

The syntax element "sub_layer_profile_present_flag[i]" set equal to 1, when ProfilePresentFlag is equal to 1, specifies that profile information is present in the profile_tier_level( ) syntax structure for the representation of the sub-layer with TemporalId equal to i. sub_layer_profile_present_flag[i] equal to 0 specifies that profile information is not present in the profile_tier_level( ) syntax structure for the representations of the sub-layer with TemporalId equal to i. When not present, the value of sub_layer_profile_present_flag[i] is inferred to be equal to 0.

The syntax element "sub_layer_level_present_flag[i]" set equal to 1 specifies that level information is present in the profile_tier_level( ) syntax structure for the representation of the sub-layer with TemporalId equal to i. sub_layer_level_present_flag[i] equal to 0 specifies that level information is not present in the profile_tier_level( ) syntax structure for the representation of the sub-layer with TemporalId equal to i.

The syntax elements "sub_layer_profile_idc[i]" and "sub_layer_level_idc[i]" have the same semantics as general_profile_idc and general_level_idc, respectively, but apply to the representation of the sub-layer with TemporalId equal to i.

Table 3 below shows an example of operation point syntax and semantics.

TABLE 3

| operation_point( opIdx ) { | Descriptor |
|---|---|
|   op_first_present_layer_id[ opIdx ] | u(6) |
|   if( !vps_simple_op_mode_flag[ opIdx ] ) { | |
|     op_num_layer_id_values_minus1[ opIdx ] | ue(v) |
|     for( i = 1; i <= op_num_layer_id_values_minus1[ opIdx ]; i++ ) | |
|       op_layer_id_delta_minus1[ opIdx ][ i ] | ue(v) |
|   } | |
| } | |

The operation_point(opIdx) syntax structure specifies the set of nuh_reserved_zero_6bits values included in the OpLayerIdSet of the operation points to which the opIdx-th hrd_parameters( ) syntax structure in the video parameter set applies.

The syntax element "op_first_present_layer_id[opIdx]," when vps_simple_op_mode_flag[opIdx] is set equal to 0, specifies the first (i.e. the 0-th) value of nuh_reserved_zero_6bits included in the OpLayerIdSet of the operation points to which the opIdx-th hrd_parameters( ) syntax structure in the video parameter set applies. When vps_simple_op_mode_flag[opIdx] is equal to 1, op_first_present_layer_id[opIdx] specifies the greatest value of nuh_reserved_zero_6bits included in the OpLayerIdSet of the operation points to which the opIdx-th hrd_parameters( ) syntax structure in the video parameter set applies.

The syntax element "op_num_layer_id_values_minus1[opIdx]" plus 1, when vps_simple_op_mode_flag[opIdx] is equal to 0, specifies the number of nuh_reserved_zero_6bits values included in the OpLayerIdSet of the operation points to which the opIdx-th hrd_parameters( ) syntax structure in the video parameter set applies. op_num_layer_id_values_minus1[opIdx] is less than or equal to 63.

The syntax element "op_layer_id_delta_minus1[opIdx][i]" plus 1, when vps_simple_op_mode_flag[opIdx] is equal to 0, specifies the difference between the i-th value of nuh_reserved_zero_6bits and the (i−1)-th value of nuh_reserved_zero_6bits included in the OpLayerIdSet of the operation points to which the opIdx-th hrd_parameters( ) syntax structure in the video parameter set applies. The value of op_layer_id_delta_minus1[opIdx][i] is in the range of 0 to 63, inclusive.

The variable NumOpLayerIdsMinus1[opIdx] is derived as follows.

```
if( vps_simple_op_mode_flag[ opIdx ])
    NumOpLayerIdsMinus1[ opIdx ] = op_first_present_layer_id[ opIdx ]
else
    NumOpLayerIdsMinus1[ opIdx ] =
    op_num_layer_id_values_minus1[ opIdx ]
NumOpLayerIdsMinus1[ 0 ] is inferred to be equal to 0.
```

The variables OpLayerId[opIdx][i], for i in the range of 0 to NumOpLayerIdsMinus1[opIdx], inclusive, are derived as follows.

```
OpLayerId[ opIdx ][ 0 ] = vps_simple_op_mode_flag[ opIdx ] ? 0 :
   op_first_present_layer_id[ opIdx ]
for( i = 1; i <= NumOpLayerIdsMinus1[ opIdx ]; i++ )
   if( vps_simple_op_mode_flag[ opIdx ] )
      OpLayerId[ opIdx ][ i ] = i
   else
      OpLayerId[ opIdx ][ i ] =
         OpLayerId[ opIdx ][ i − 1 ] + op_layer_id_delta_minus1[
         opIdx ][ i ] + 1
```
The value of OpLayerId[ 0 ][ 0 ] is inferred to be equal to 0.

No value of OpLayerId[opIdx][i] is equal to OpLayerId [opIdx][j] when i is not equal to j and both i and j are in the range of 0 to NumOpLayerIdsMinus1[opIdx], inclusive.

Any two sets OpLayerId[opIdx1] and OpLayerId[opIdx2], where opIdx1 is not equal to opIdx2, is not include the same sets of nuh_reserved_zero_6bits values.

The OpLayerIdSet of the operation points to which the opIdx-th hrd_parameters( ) syntax structure in the video parameter set applies is set to include and only include the nuh_reserved_zero_6bits values equal to OpLayerId[opIdx][i], for i in the range of 0 to NumOpLayerIdsMinus1[opIdx], inclusive.

Alternative operation point syntax and semantics are described in Table 4 and below.

TABLE 4

| operation_point( opIdx ) { | Descriptor |
|---|---|
| if( !vps_simple_op_mode_flag[ opIdx ] )<br>  op_num_layer_id_values_minus1[ opIdx ]<br>  for( i = 0; i <= op_num_layer_id_values_minus1[<br>  opIdx ]; i++ )<br>    op_layer_id[ opIdx ][ i ]<br>} | ue(v)<br><br><br><br>u(6) |

The operation_point(opIdx) syntax structure specifies the set of nuh_reserved_zero_6bits values included in the OpLayerIdSet of the operation points to which the opIdx-th hrd_parameters( ) syntax structure in the video parameter set applies.

The syntax element "op_num_layer_id_values_minus1 [opIdx]" plus 1 specifies the number of nuh_reserved_zero_6bits values included in the OpLayerIdSet of the operation points to which the opIdx-th hrd_parameters( ) syntax structure in the video parameter set applies. op_num_layer_id_values_minus1[opIdx] is less than or equal to 63. When not present, the value of op_num_layer_id_values_minus1[opIdx] is inferred to be equal to 0.

In bitstreams conforming to this Specification, op_num_layer_id_values_minus1[opIdx] is equal to 0. Although the value of op_num_layer_id_values_minus1 [opIdx] is required to be equal to 0 in this version of this Specification, decoders allow other values to appear in the op_num_layer_id_values_minus1[opIdx] syntax.

The syntax element "op_layer_id[opIdx][i]" specifies the i-th value of nuh_reserved_zero_6bits included in the OpLayerIdSet of the operation points to which the opIdx-th hrd_parameters( ) syntax structure in the video parameter set applies.

The variable NumOpLayerIdsMinus1[opIdx] is derived as follows.

```
if( vps_simple_op_mode_flag[ opIdx ] )
   NumOpLayerIdsMinus1[ opIdx ] = op_layer_id[ opIdx ][ 0 ]
else
   NumOpLayerIdsMinus1[ opIdx ] =
      op_num_layer_id_values_minus1[ opIdx ]
NumOpLayerIdsMinus1[ 0 ] is inferred to be equal to 0.
```

The variables OpLayerId[opIdx][i], for i in the range of 0 to NumOpLayerIdsMinus1[opIdx], inclusive, are derived as follows.

```
for( i = 0; i <= NumOpLayerIdsMinus1[ opIdx ]; i++ )
   OpLayerId[ opIdx ][ i ] = vps_simple_op_mode_flag[ opIdx ] ? i :
      op_layer_id[ opIdx ][ i ]
The value of OpLayerId[ 0 ][ 0 ] is inferred to be equal to 0.
```

No value of OpLayerId[opIdx][i] is equal to OpLayerId [opIdx][j] when i is not equal to j and both i and j are in the range of 0 to NumOpLayerIdsMinus1[opIdx], inclusive.

Any two sets OpLayerId[opIdx1] and OpLayerId[opIdx2], where opIdx1 is not equal to opIdx2, do not include the same sets of nuh_reserved_zero_6bits values.

The OpLayerIdSet of the operation points to which the opIdx-th hrd_parameters( ) syntax structure in the video parameter set applies is set to include and only include the nuh_reserved_zero_6bits values equal to OpLayerId[opIdx][i], for i in the range of 0 to NumOpLayerIdsMinus1[opIdx], inclusive.

JCTVC-K0204 (which is incorporated herein by reference and available at http://phenix.int-evry.fr/jct/doc_en-d_user/documents/11_Shanghai/wg11/JCTVC-K0204-v1.zip) provided a revised signaling of operation point as described by the following syntax and semantics:

TABLE 5

| operation_point( opIdx ) { | Descriptor |
|---|---|
|   for( i = 0; i <= max_num_layers_minus1; i++ )<br>    layer_present_in_op_flag[ opIdx ][ i ]<br>} | <br>u(1) |

The syntax element "layer_present_in_op_flag[opIdx][i]" set equal to 1 specifies that layer i is present in operation point opIdx, equal to 0 specifies that layer i is not present in operation point opIdx.

Existing methods for signalling of operation points may have some potential shortcomings. For example, existing methods for signaling of operation points may either have entropy coded syntax elements using ue(v) coding as specified in HEVC WD8, or does not support signalling of nuh_reserved_zero_6bits values (i.e. layer IDs) greater than max_num_layers_minus1, which is signaled in the video parameter set (VPS).

This disclosure proposes various techniques that may potentially address some of these potential shortcomings. In one such technique, the greatest value of nuh_reserved_zero_6bits value (i.e. the greatest layer ID value) is firstly signaled, followed by a list of flags, each specifying whether the layer with a particular value of layer ID less than the greatest layer ID value is included in the OpLayerIdSet of the operation points to which the opIdx-th hrd_parameters( ) syntax structure in the video parameter set applies. In another technique, a list of M flags is signaled, each specifying whether the layer with a particular possible layer ID value is included in the OpLayerIdSet of the operation points to which the opIdx-th hrd_parameters( ) syntax structure in the video parameter set applies. The value of M is equal to the total number of possible different layer IDs in any bitstreams. For example, M may be equal to $2^N$, where N is the number of bits used to represent nuh_reserved_zero_6bits (i.e. the layer ID). In yet another technique, the greatest value of nuh_reserved_zero_6bits value (i.e. the greatest layer ID value) is signaled. If the simple operation point mode is not in use, then a list of flags is signaled, each specifying whether the layer with a particular value of layer ID less than the greatest layer ID value is included in the OpLayerIdSet of the operation points to which the opIdx-th hrd_parameters( ) syntax structure in the video parameter set applies.

Some detailed examples of the above techniques will now be described. The examples described below are generally consistent with HEVC WD8, and therefore, aspects not fully described below may be assumed to be the same as in HEVC WD8.

Operation point syntax and semantics for a first example are shown in Table 6 below.

TABLE 6

| operation_point( opIdx ) { | Descriptor |
|---|---|
| op_max_layer_id[ opIdx ] | u(6) |
| for( i = 0; i < op_max_layer_id[ opIdx ]; i++ ) | |
| op_layer_id_included_flag[ opIdx ][ i ] | u(1) |
| } | |

The operation_point(opIdx) syntax structure specifies the set of nuh_reserved_zero_6bits values included in the OpLayerIdSet of the operation points to which the opIdx-th hrd_parameters( ) syntax structure in the video parameter set applies.

The syntax element "op_max_layer_id[opIdx]" specifies the greatest value of nuh_reserved_zero_6bits included in the OpLayerIdSet of the operation points to which the opIdx-th hrd_parameters( ) syntax structure in the video parameter set applies. Although Table 6 shows the syntax element "op_max_layer_id[opIdx]" being signaled for each operation point, it may also be signalled elsewhere in the encoded bitstream such as in a sequence parameter set or VPS.

The syntax element "op_layer_id_included_flag[opIdx] [i]" set equal to 0 specifies that value of nuh_reserved_zero_6bits equal to i is not included in the OpLayerIdSet of the operation points to which the opIdx-th hrd_parameters( ) syntax structure in the video parameter set applies. op_layer_id_included_flag[opIdx][i] equal to 1 specifies that value of nuh_reserved_zero_6bits equal to i is included in the OpLayerIdSet of the operation points to which the opIdx-th hrd_parameters( ) syntax structure in the video parameter set applies. The sum of all op_layer_id_included_flag[opIdx][i], for i from 0 to op_max_layer_id [opIdx]−1, inclusive, is less than or equal to max_num_layers_minus1.

The variable NumOpLayerIdsMinus1[opIdx] and the variables OpLayerId[opIdx][i], for i in the range of 0 to NumOpLayerIdsMinus1[opIdx], inclusive, are derived as follows.

```
for( i = 0, j = 0; i < op_max_layer_id[ opIdx ]; i++ )
    if( op_layer_id_incuded_flag[ opIdx ][ i ] )
        OpLayerId[ opIdx ][ j++ ] = i
OpLayerId[ opIdx ][ j ] = op_max_layer_id[ opIdx ]
NumOpLayerIdsMinus1[ opIdx ] = j
```

NumOpLayerIdsMinus1[0] is inferred to be equal to 0. The value of OpLayerId[0][0] is inferred to be equal to 0.

Any two sets OpLayerId[opIdx1] and OpLayerId[opIdx2], where opIdx1 is not equal to opIdx2, do not include the same set of nuh_reserved_zero_6bits values.

The OpLayerIdSet of the operation points to which the opIdx-th hrd_parameters( ) syntax structure in the video parameter set applies is set to include and only include the nuh_reserved_zero_6bits values equal to OpLayerId[opIdx] [i], for i in the range of 0 to NumOpLayerIdsMinus1[opIdx], inclusive.

Referring back to the example above, assume a bitstream includes six substreams of various temporal and spatial resolutions, with each substream having a layer ID. For the operation point identified by opIdx, the greatest layer ID value can be signaled in the bitstream as the value of the syntax element "op_max_layer_id[opIdx]." For purposes of this example, assume the greatest layer ID value is 9, such that op_max_layer_id[opIdx] equals 9. The remaining layer ID values can be signaled using nine flags, where a first flag indicates if layer ID value 0 is present, the second flag indicates if layer ID value 1 is present, and so on. Thus, to signal layer ID values 2, 5, and 10, the value 10 can first be signaled followed by the sequences of flags 001001000, where the 1 for the third bit indicates layer ID value 2 is present and the 1 for the sixth bit indicates layer ID value 5 is present. Using the syntax of Table 6, the sequences of flags 001001000 is obtained as follows. For i=0, the value of the flag for op_layer_id_included_flag[opIdx][i] is 0. For i=1, the value of the flag for op_layer_id_included_flag[opIdx][i] is 0. For i=3, the value of the flag for op_layer_id_included_flag[opIdx][i] is 0. For i=4, the value of the flag for op_layer_id_included_flag[opIdx][i] is 0. For i=5, the value of the flag for op_layer_id_included_flag[opIdx][i] is 1. For i=6, the value of the flag for op_layer_id_included_flag [opIdx][i] is 0. For i=7, the value of the flag for op_layer_id_included_flag[opIdx][i] is 0. For i=8, the value of the flag for op_layer_id_included_flag[opIdx][i] is 0. For i=9, the value of i is not less than op_max_layer_id[opIdx], which is also equal to 9. Therefore, a video decoder can determine that the last flag was received.

Operation point syntax and semantics for a second example techniques are shown in Table 7 below.

TABLE 7

| operation_point( opIdx ) { | Descriptor |
|---|---|
| for( i = 0; i < 64; i++ ) | |
| op_layer_id_included_flag[ opIdx ][ i ] | u(1) |
| } | |

The operation_point(opIdx) syntax structure specifies the set of nuh_reserved_zero_6bits values included in the OpLayerIdSet of the operation points to which the opIdx-th hrd_parameters( ) syntax structure in the video parameter set applies.

The syntax element "op_layer_id_included_flag[opIdx] [i]" set equal to 0 specifies that value of nuh_reserved_zero_6bits equal to i is not included in the OpLayerIdSet of the operation points to which the opIdx-th hrd_parameters( ) syntax structure in the video parameter set applies. op_layer_id_included_flag[opIdx][i] equal to 1 specifies that value of nuh_reserved_zero_6bits equal to i is included in the OpLayerIdSet of the operation points to which the opIdx-th hrd_parameters( ) syntax structure in the video parameter set applies. The sum of all op_layer_id_included_flag[opIdx][i], for i from 0 to 63, inclusive, is less than or equal to max_num_layers_minus1.

The variable NumOpLayerIdsMinus1[opIdx] and the variables OpLayerId[opIdx][i], for i in the range of 0 to NumOpLayerIdsMinus1[opIdx], inclusive, are derived as follows.

```
for( i = 0, j = 0; i<64; i++ )
    if( op_layer_id_incuded_flag[ opIdx ][ i ] )
        OpLayerId[ opIdx ][ j++ ] = i
NumOpLayerIdsMinus1[ opIdx ] = j
```

NumOpLayerIdsMinus1[0] is inferred to be equal to 0. The value of OpLayerId[0][0] is inferred to be equal to 0.

Any two sets OpLayerId[opIdx1] and OpLayerId[opIdx2], where opIdx1 is not equal to opIdx2, do not include the same set of nuh_reserved_zero_6bits values.

The OpLayerIdSet of the operation points to which the opIdx-th hrd_parameters( ) syntax structure in the video parameter set applies is set to include and only include the nuh_reserved_zero_6bits values equal to OpLayerId[opIdx][i], for i in the range of 0 to NumOpLayerIdsMinus1[opIdx], inclusive.

Operation point syntax and semantics for a third example are shown in Table 8 below. In this example, the VPS syntax and semantics are also changed, as shown in Table 8 and as described below.

TABLE 8

| video_parameter_set_rbsp( ) { | Descriptor |
|---|---|
| video_parameter_set_id | u(4) |
| vps_temporal_id_nesting_flag | u(1) |
| vps_reserved_zero_2bits | u(2) |
| vps_reserved_zero_6bits | u(6) |
| vps_max_sub_layers_minus1 | u(3) |
| profile_tier_level( 1, vps_max_sub_layers_minus1 ) | |
| vps_reserved_zero_12bits | u(12) |
| for( i = 0; i <= vps_max_sub_layers_minus1; i++ ) { | |
|   vps_max_dec_pic_buffering[ i ] | ue(v) |
|   vps_max_num_reorder_pics[ i ] | ue(v) |
|   vps_max_latency_increase[ i ] | ue(v) |
| } | |
| vps_num_hrd_parameters | ue(v) |
| for( i = 0; i < vps_num_hrd_parameters; i++ ) { | |
|   vps_simple_op_mode_flag[ i ] | u(1) |
|   if( i > 0 ) | |
|     operation_point( i ) | |
|   hrd_parameters( i == 0, vps_max_sub_layers_minus1 ) | |
| } | |
| vps_extension_flag | u(1) |
| if( vps_extension_flag ) | |
|   while( more_rbsp_data( ) ) | |
|     vps_extension_data_flag | u(1) |
| rbsp_trailing_bits( ) | |
| } | |

The syntax element "vps_simple_op_mode_flag[i]" set equal to 1 specifies that the simple operation point mode is in use for the i-th operation_point( ) syntax structure. vps_simple_op_mode_flag[i] equal to 0 specifies that the simple operation point mode is not in use for the i-th operation_point( ) syntax structure.

Any two instances of the syntax structure hrd_parameters (i, vps_max_sub_layers_minus1) and hrd_parameters(j, vps_max_sub_layers_minus1), where i is not equal to j, do not have the same content.

TABLE 9

| operation_point( opIdx ) { | Descriptor |
|---|---|
| op_max_layer_id[ opIdx ] | u(6) |
| if( !vps_simple_op_mode_flag[ opIdx ] ) | |
|   for( i = 0; i < op_max_layer_id[ opIdx ]; i++ ) | |
|     op_layer_id_included_flag[ opIdx ][ i ] | u(1) |
| } | |

The operation_point(opIdx) syntax structure shown in Table 9 specifies the set of nuh_reserved_zero_6bits values included in the OpLayerIdSet of the operation points to which the opIdx-th hrd_parameters( ) syntax structure in the video parameter set applies.

The syntax element "op_max_layer_id[opIdx]" specifies the greatest value of nuh_reserved_zero_6bits included in the OpLayerIdSet of the operation points to which the opIdx-th hrd_parameters( ) syntax structure in the video parameter set applies.

The syntax element "op_layer_id_included_flag[opIdx][i]" set equal to 0, when vps_simple_op_mode_flag[opIdx] is equal to 0, specifies that value of nuh_reserved_zero_6bits equal to i is not included in the OpLayerIdSet of the operation points to which the opIdx-th hrd_parameters( ) syntax structure in the video parameter set applies. op_layer_id_included_flag[opIdx][i] equal to 1, when vps_simple_op_mode_flag[opIdx] is equal to 0, specifies that value of nuh_reserved_zero_6bits equal to i is included in the OpLayerIdSet of the operation points to which the opIdx-th hrd_parameters( ) syntax structure in the video parameter set applies. The sum of all op_layer_id_included_flag[opIdx][i], for i from 0 to op_max_layer_id[opIdx]−1, inclusive, is less than or equal to max_num_layers_minus1.

The variable NumOpLayerIdsMinus1[opIdx] and the variables OpLayerId[opIdx][i], for i in the range of 0 to NumOpLayerIdsMinus1[opIdx], inclusive, are derived as follows.

```
if( vps_simple_op_mode_flag[ opIdx ] ) {
    for( i = 0; i <= op_max_layer_id[ opIdx ]; i++ )
        OpLayerId[ opIdx ][ i ] = i
    NumOpLayerIdsMinus1[ opIdx ] = op_max_layer_id[ opIdx ]
} else {
    for( i = 0, j = 0; i < op_max_layer_id[ opIdx ]; i++ )
        if( op_layer_id_incuded_flag[ opIdx ][ i ] )
            OpLayerId[ opIdx ][ j++ ] = i
    OpLayerId[ opIdx ][ j ] = max_layer_id[ opIdx ]
    NumOpLayerIdsMinus1[ opIdx ] = j
}
```

NumOpLayerIdsMinus1[0] is inferred to be equal to 0. The value of OpLayerId[0][0] is inferred to be equal to 0.

Any two sets OpLayerId[opIdx1] and OpLayerId[opIdx2], where opIdx1 is not equal to opIdx2, do not include the same set of nuh_reserved_zero_6bits values.

The OpLayerIdSet of the operation points to which the opIdx-th hrd_parameters( ) syntax structure in the video parameter set applies is set to include and only include the nuh_reserved_zero_6bits values equal to OpLayerId[opIdx][i], for i in the range of 0 to NumOpLayerIdsMinus1[opIdx], inclusive.

Figure 2:
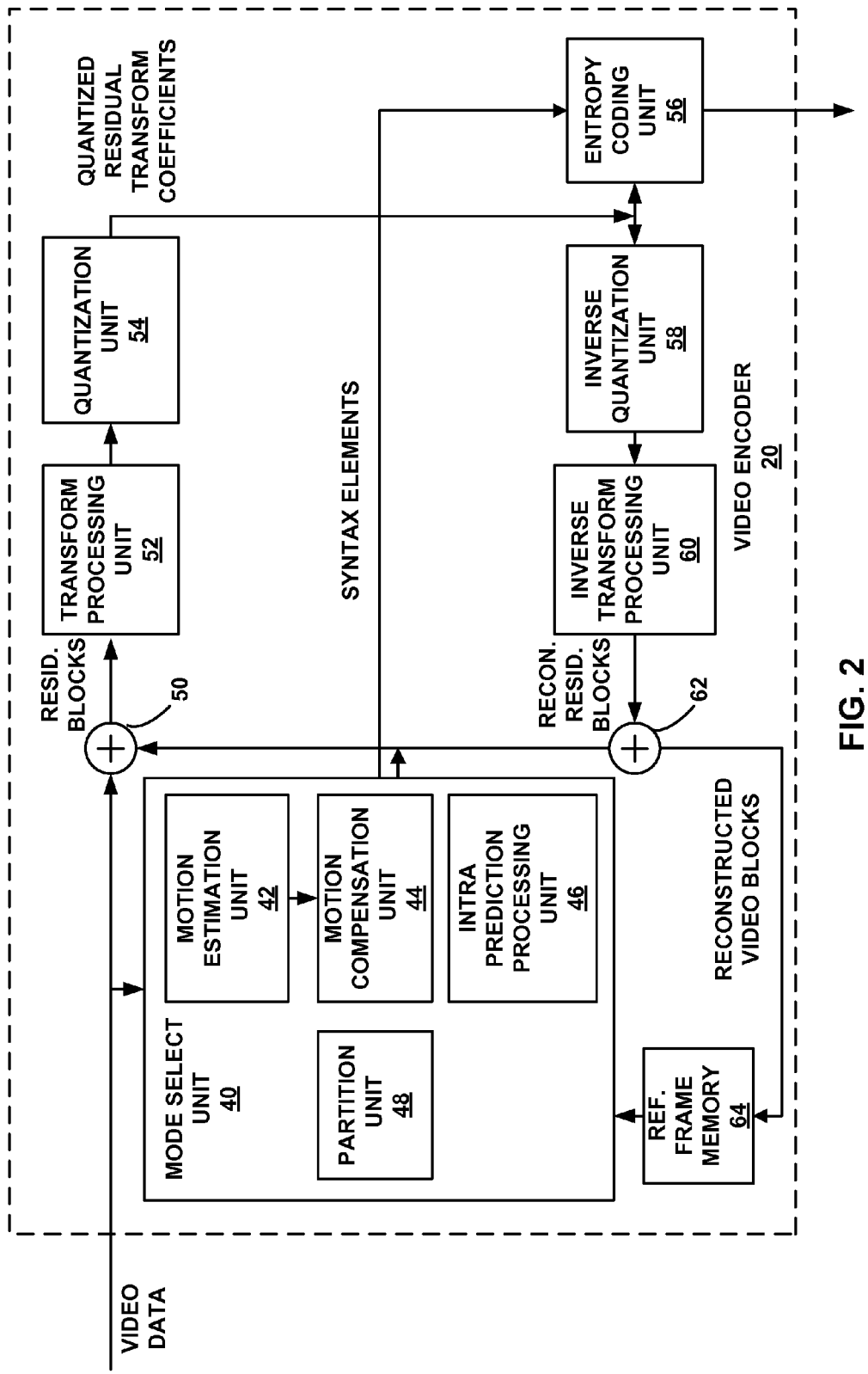
FIG. 2 is a block diagram illustrating an example video encoder that may implement the techniques described in this disclosure.

FIG. 2 is a block diagram illustrating an example of video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction processing unit 46, and partition unit 48. For video block reconstruction, video encoder 20 also includes inverse quantization unit 58, inverse transform processing unit 60, and summer 62. A deblocking filter may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction processing unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes.

For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction processing unit 46 may calculate ratios from the distortions and rates for the various encoded blocks to determine which intra-prediction mode exhibits the best rate-distortion value for the block.

After selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54.

Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
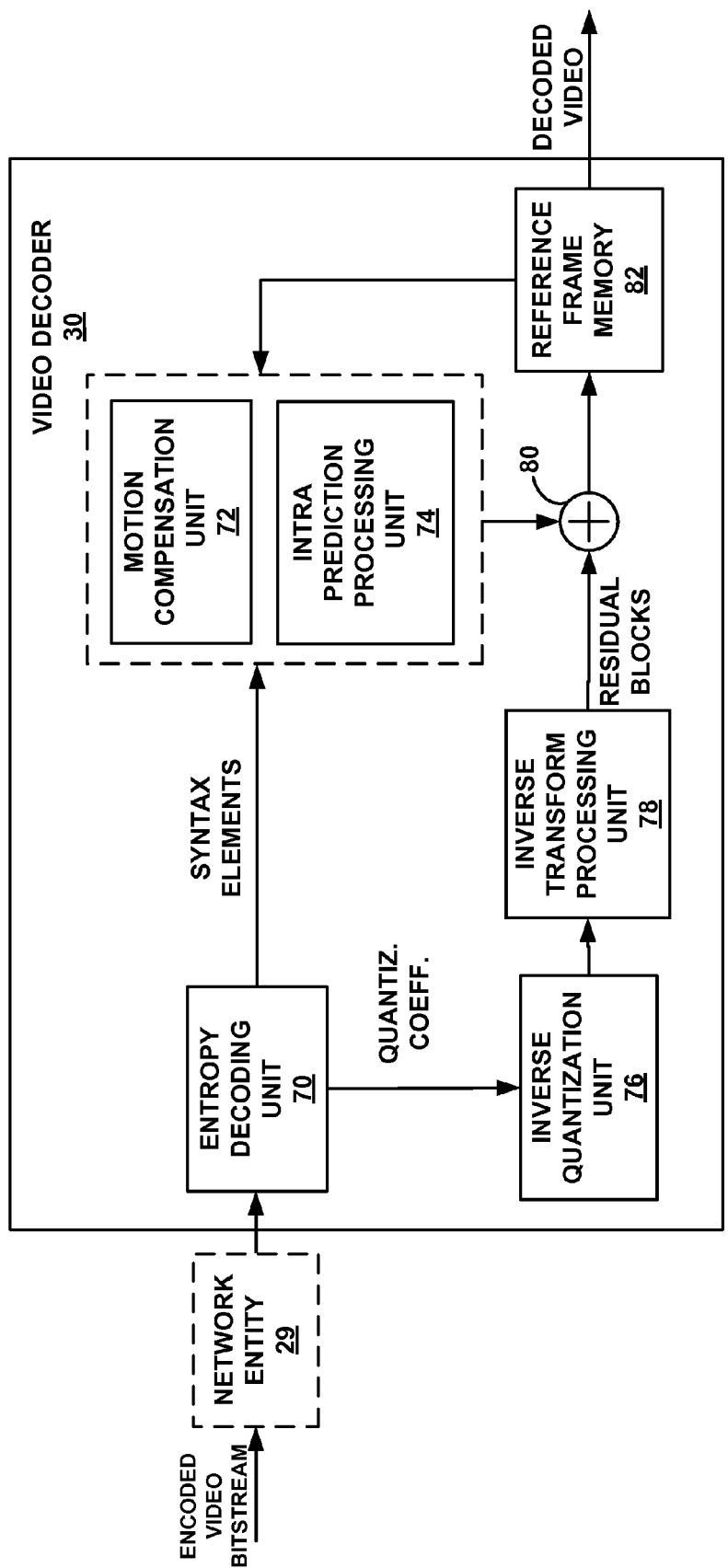
FIG. 3 is a block diagram illustrating an example video decoder that may implement the techniques described in this disclosure.

FIG. 3 is a block diagram illustrating an example of video decoder 30 that may implement the techniques described in this disclosure. In the example of FIG. 3, video decoder 30 includes an entropy decoding unit 70, motion compensation unit 72, intra prediction processing unit 74, inverse quantization unit 76, inverse transform processing unit 78, reference frame memory 82 and summer 80. Video decoder 30 may, in some examples, perform a decoding pass generally reciprocal to the encoding pass described with respect to video encoder 20, as shown in FIG. 2.

During the decoding process, video decoder 30 receives an encoded video bitstream that represents video blocks of an encoded video slice and associated syntax elements from video encoder 20. Video decoder 30 may receive the encoded video bitstream from a network entity 29. Network entity 29 may, for example, be a server, a media-aware network element (MANE), a video editor/splicer, or other such device configured to implement one or more of the techniques described above. Network entity 29 may include an external means configured to perform the techniques of this disclosure. As described above, some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30.

In one example, network entity 29 may store or receive an original bitstream of video data that is scalable and/or includes multiple layers or views. In the original bitstream, a parameter set, such as a VPS, may include the operation point syntax discussed above. The operation point syntax may be used, by network entity 29, to identify which layers are present in the operation point. From the original bitstream, network entity 29 may choose one of the multiple operation points (i.e. sub-bitstreams) based on the operation point syntax included in the VPS and based on what is desirable for or what was requested by the video decoder 30. For the sub-bitstream corresponding to the chosen operation point, network entity 29 may forward to video decoder 30 the VLC NAL units and non-VCL NAL units that comprise that bitstream and not forward the other NAL units.

For a particular operation point identified in the VPS, network entity 29 may receive an indication of a maximum layer ID value for a bitstream and receive a series of flags for the layers with layer ID value less than the maximum layer ID value. Based on values of the flags, network entity 29 can determine which layers are included in the operation point. For example, if the value of the maximum layer ID is M, then layer M is included in the operation point. For layer M−1, network entity 29 receives a flag, where a first value (e.g. 1 or 0) of the flag indicates layer M−1 is included in the operation point and a second value (e.g. 0 or 1) of the flag indicates layer M−1 is not included in the operation point. For layer M−2, network entity 29 receives a second flag, where a first value (e.g. 1 or 0) of the second flag indicates layer M−2 is included in the operation point and a second value (e.g. 0 or 1) of the second flag indicates layer M−2 is not included in the operation point. Network entity 29 may likewise receive flags for all the remaining layers down to layer 0. Thus, if the value of the maximum layer ID is M, then network entity 29 may receive flags for all of layers 0 to M−1.

Entropy decoding unit 70 of video decoder 30 entropy decodes the bitstream provided by network entity 29 to generate quantized coefficients, motion vectors or intra-prediction mode indicators, and other syntax elements such as the operation point syntax described above. Entropy decoding unit 70 forwards the motion vectors and other syntax elements to motion compensation unit 72. Video decoder 30 may receive the different syntax elements at different parts of the encoded bitstream. For example, some syntax elements may be received at the VPS level, SPS level, or APS level, while other syntax elements are received at the video slice level and/or the video block level.

When the video slice is coded as an intra-coded (I) slice, intra prediction processing unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference frame memory 82, which stores reference pictures used for subsequent motion compensation. Reference frame memory 82 also stores decoded video for later presentation on a display device, such as display device 32 of FIG. 1.

Figure 4:
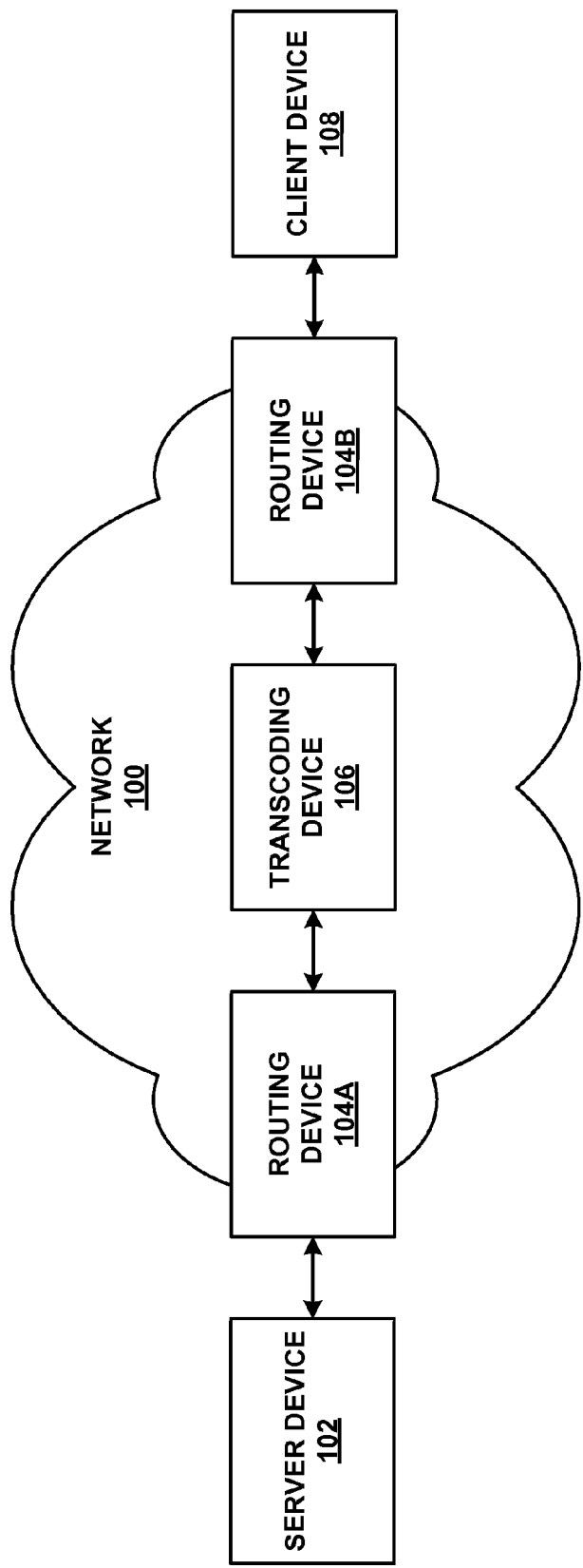
FIG. 4 is a block diagram illustrating an example set of devices that form part of a network.

FIG. 4 is a block diagram illustrating an example set of devices that form part of network 100. In this example, network 100 includes routing devices 104A, 104B (routing devices 104) and transcoding device 106. Routing devices 104 and transcoding device 106 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. Server device 102 may correspond to source device 12 (FIG. 1), while client device 108 may correspond to destination device 14 (FIG. 1), in some examples.

In general, routing devices 104 implement one or more routing protocols to exchange network data through network 100. In some examples, routing devices 104 may be configured to perform proxy or cache operations. Therefore, in some examples, routing devices 104 may be referred to as proxy devices. In general, routing devices 104 execute routing protocols to discover routes through network 100. By executing such routing protocols, routing device 104B may discover a network route from itself to server device 102 via routing device 104A.

Routing devices 104 and transcoding device 106 are examples of devices that may implement techniques described in this disclosure. For example, as part of routing video data from server device 102 to client device 108, routing devices 104 and/or transcoding device 106 may receive VPS syntax that includes operation point syntax. The operation point syntax may, for example, includes a maximum layer ID value for a bitstream. Routing devices 104 and transcoding device 106 may additionally receive in the operation point syntax one or more flags for the layers with layer IDs less than the maximum layer ID value. Based on the maximum layer ID value and the flags, routing devices 104 and transcoding device 106 may determine the layers included in the operation point, and thus may identify the NAL units that comprise the sub-bitstream of the operation point.

Figure 5:
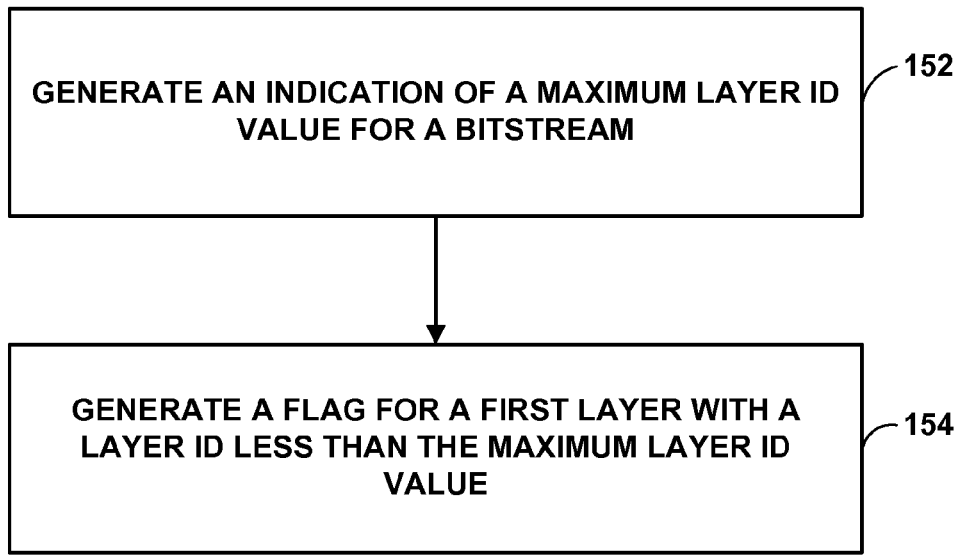
FIG. 5 is a flowchart illustrating an example method for encoding video data, according to techniques described in this disclosure.

FIG. 5 shows an example method of encoding video data according to the techniques of this disclosure. The techniques of FIG. 5 will be described with reference to a video encoder, such as video encoder 20. Video encoder 20 may generate, in a bitstream of encoded video data, an indication of a maximum layer ID value for a bitstream (152). Video encoder 20 may also generate a flag for a first layer with a layer ID value less than the maximum layer ID value (154).

The indication of the maximum layer ID and the flag may, for example, be part of operation point syntax contained in a VPS.

Figure 6:
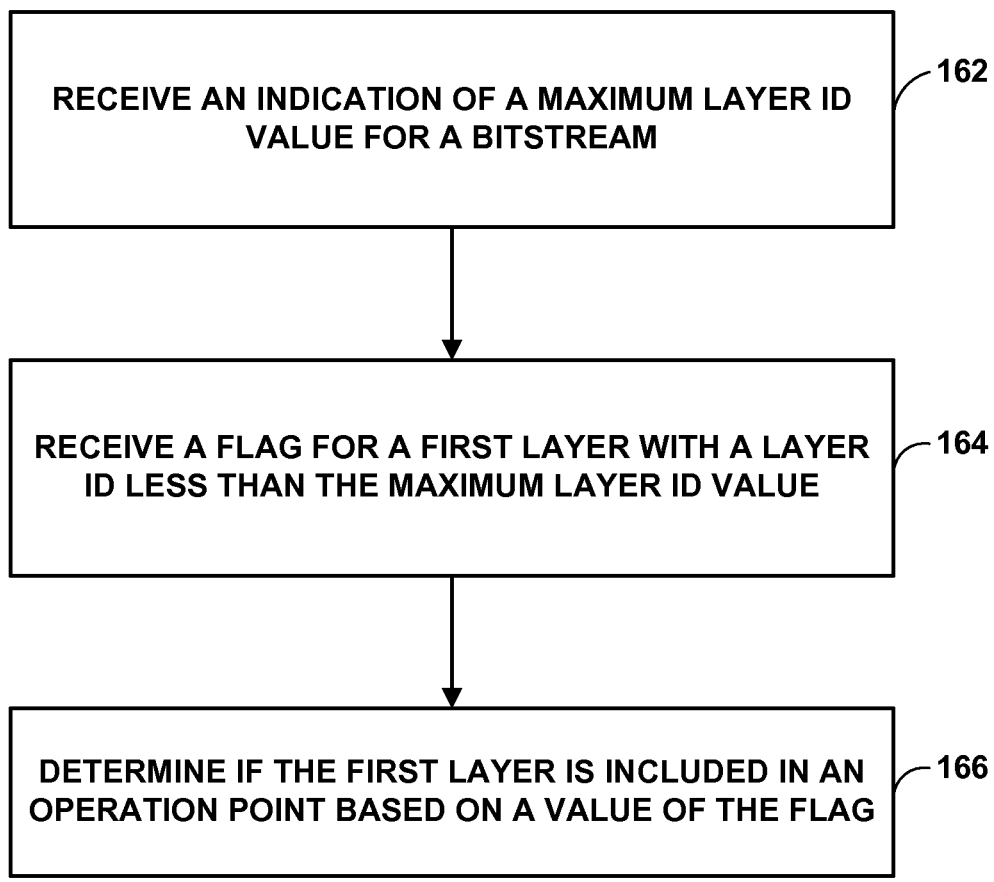
FIG. 6 is a flowchart illustrating an example method for processing video data, according to techniques described in this disclosure.

FIG. 6 shows an example method of processing video data according to the techniques of this disclosure. The techniques of FIG. 6 will be described with reference to a video processing device, which may correspond to a video decoder such as video decoder 30 of FIG. 1 and FIG. 3 or which may correspond to a network device or network entity such as network device 13 of FIG. 1, network entity 29 of FIG. 3, or routing devices 104 or transcoding device 106 of FIG. 4. A video processing device may receive, in a bitstream of encoded video data, an indication of a maximum layer ID value for a bitstream (162). The video processing device may also receive a flag for a first layer with a layer ID value less than the maximum layer ID value (164). Based on the value of the flag, The video processing device may determine if the first layer is included in an operation point based on a value of the flag (166).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing multi-layer video data, the method comprising:
receiving, in a video parameter set, a syntax element specifying a maximum layer identification (ID) value for any NAL units associated with a first set of layers, wherein the multi-layer video data comprises two or more sets of layers, wherein each of the two or more sets of layers is associated with at least one independently decodable bitstream of the multi-layer video data and comprises two or more layers;
for the first set of layers of the at least one set of layers, receiving, in the video parameter set, a one-bit layerID included flag for a first layer with a layer ID value less than the maximum layer ID value; based on a value of the one-bit layerID included flag, determining that the first layer is included in the first set of layers;
receiving a plurality of NAL units, each respective NAL unit of the plurality of NAL units having a NAL unit header comprising a layer ID syntax element specifying a layer to which the respective NAL unit belongs: and determining that a NAL unit of the plurality of NAL units is included in the first layer based on a layer ID syntax element of the NAL unit corresponding to the first layer.

2. The method of claim 1 further comprising:
receiving, in the video parameter set, an additional one-bit layerID included flag for each layer ID value, other than the layer ID value associated with the first layer, between one and the maximum layer ID value, wherein a value for each additional one-bit layerID included flag indicates whether a layer associated with a respective layer ID value is included in the first set of layers.

3. The method of claim 1, wherein a first value for the one-bit layerID included flag indicates the first layer is included in the first set of layers and a second value for the one-bit layerID included flag indicates the first layer is not included in the first set of layers.

4. The method of claim 1, wherein the first set of layers comprises an operation point.

5. The method of claim 1, wherein the method is performed by a media aware network element (MANE), and wherein the method further comprises: in response to the first layer being included in the first set of layers, identifying, from the plurality of NAL units, one or more NAL units with the layer ID value less than the maximum layer ID value; extracting, from the multi-layer video data, the one or more NAL units with the layer ID value less than the maximum layer ID value.

6. A device for processing multi-layer video data, the device comprising:
a memory configured to store the multi-layer video data; and one or more processors configured to:
receive, in a video parameter set, a syntax element specifying a maximum layer identification (ID) value for any NAL units associated with a first set of layers, wherein the multi-layer video data comprises two or more sets of layers, wherein each of the two or more sets of layers is associated with at least one independently decodable bitstream of the multi-layer video data and comprises two or more layers;
for the first set of layers of the at least one set of layers, receive, in the video parameter set, a one-bit layerID included flag for a first layer with a layer ID value less than the maximum layer ID value; and based on a value of the one-bit layerID included flag, determine that the first layer is included in the first set of layers;
receive a plurality of NAL units, each respective NAL unit of the plurality of NAL units having a NAL unit header comprising a layer ID syntax element specifying a layer to which the respective NAL unit belongs: and determine that a NAL unit of the plurality of NAL units is included in the first layer based on a layer ID syntax element of the NAL unit corresponding to the first layer.

7. The device of claim 6, wherein the one or more processors are further configured to receive, in the video parameter set, an additional one-bit layerID included flag for each layer ID value, other than the layer ID value associated with the first layer, between one and the maximum layer ID value, wherein a value for each additional one-bit layerID included flag indicates whether a layer associated with a respective layer ID value is included in the first set of layers.

8. The device of claim 6, wherein a first value for the one-bit layerID included flag indicates the first layer is included in the first set of layers and a second value for the one-bit layerID included flag indicates the first layer is not included in the first set of layers.

9. The device of claim 6, wherein the first set of layers comprises an operation point.

10. The device of claim 6, wherein the device comprises a media aware network element (MANE), and wherein the one or more processors are further configured to:
in response to the first layer being included in the first set of layers, identify, from the plurality of NAL units, one or more NAL units with the layer ID value less than the maximum layer ID value;
extract, from the multi-layer video data, the one or more NAL units with the layer ID value less than the maximum layer ID value.

11. The device of claim 6, wherein the device comprises at least one of:
an integrated circuit;
a microprocessor; or
a wireless communication device.

12. An apparatus for processing multi-layer video data, the apparatus comprising:
means for receiving, in a video parameter set, a syntax element specifying a maximum layer identification (ID) value for any NAL units associated with a first set of layers, wherein the multi-layer video data comprises two or more sets of layers, wherein each of the two or more sets of layers is associated with at least one independently decodable bitstream of the multi-layer video data and comprises two or more layers; means for receiving, in the video parameter set and for the first set of layers of the at least one set of layers, a one-bit layerID included flag for a first layer with a layer ID value less than the maximum layer ID value; and means for determining that the first layer is included in the first set of layers based on a value of the one-bit layerID included flag;
means for receiving a plurality of NAL units, each respective NAL unit of the plurality of NAL units having a NAL unit header comprising a layer ID syntax element specifying a layer to which the respective NAL unit belongs: and means for determining that a NAL unit of the plurality of NAL units is included in the first layer based on a layer ID syntax element of the NAL unit corresponding to the first layer.

13. The apparatus of claim 12 further comprising:
means for receiving in the video parameter set, an additional one-bit layerID included flag for each layer ID value, other than the layer ID value associated with the first layer, between one and the maximum layer ID value, wherein a value for each additional one-bit layerID included flag indicates whether a layer associated with a respective layer ID value is included in the first set of layers.

14. The apparatus of claim 12, wherein a first value for the one-bit layerID included flag indicates the first layer is included in the first set of layers and a second value for the one-bit layerID included flag indicates the first layer is not included in the first set of layers.

15. The apparatus of claim 12, wherein the first set of layers comprises an operation point.

16. The apparatus of claim 12, wherein the apparatus comprises a media aware network element (MANE), and wherein the apparatus further comprises means for identifying, from the plurality of NAL units, one or more NAL units with the layer ID value less than the maximum layer ID value; and means for extracting, from the multi-layer video data, the one or more NAL units with the layer ID value less than the maximum layer ID value.

17. A non-transitory, computer readable storage medium storing instructions that when executed by one or more processors cause the one or more processors to: receive, in a video parameter set, a syntax element specifying a maximum layer identification (ID) value for any NAL units associated with a first set of layers, wherein the multi-layer video data comprises two or more sets of layers, wherein each of the two or more sets of layers is associated with at least one independently decodable bitstream of the multi-layer video data and comprises two or more layers;
for the first set of layers of the at least one set of layers, receive, in the video parameter set, a one-bit layerID included flag for a first layer with a layer ID value less than the maximum layer ID value; based on a value of the one-bit layerID included flag, determine that the first layer is included in the first set of layers;

receive a plurality of NAL units, each respective NAL unit of the plurality of NAL units having a NAL unit header comprising a layer ID syntax element specifying a layer to which the respective NAL unit belongs: and determine that a NAL unit of the plurality of NAL units is included in the first layer based on a layer ID syntax element of the NAL unit corresponding to the first layer.

18. The non-transitory, computer readable storage medium of claim 17 storing further instructions configured to cause the one or more processors to:

receive in the video parameter set, an additional one-bit layerID included flag for each layer ID value, other than the layer ID value associated with the first layer, between one and the maximum layer ID value, wherein a value for each additional one-bit layerID included flag indicates whether a layer associated with a respective layer ID value is included in the first set of layers.

19. The non-transitory, computer-readable medium of claim 17, wherein a first value for the one-bit layerID included flag indicates the first layer is included in the first set of layers and a second value for the one-bit layerID included flag indicates the first layer is not included in the first set of layers.

20. The non-transitory, computer-readable medium of claim 17, wherein the first set of layers comprises an operation point.

21. The non-transitory, computer-readable medium of claim 17 storing further instructions that cause the one or more processors to:

in response to the first layer being included in the first set of layers, identify one or more NAL units with the layer ID value less than the maximum layer ID value; and extract, from the multi-layer video data, the one or more NAL units with the layer ID value less than the maximum layer ID value.

22. A method of encoding multi-layer video data, the method comprising:

determining, for the multi-layer video data, a set of layers, wherein the set of layers corresponds to at least one independently decodable bitstream of the multi-layer video data and comprises two or more layers; generating, for inclusion in a video parameter set, a syntax element specifying a maximum layer identification (ID) value for any NAL units associated with a first set of layers, wherein the multi-layer video data comprises two or more sets of layers, wherein each of the two or more sets of layers is associated with at least one independently decodable bitstream of the video data and comprises two or more layers: generating, for inclusion in the video parameter set, a one-bit layerID included flag for a first layer with a layer ID value less than the maximum layer ID value, wherein a value for the one-bit layerID included flag signals whether the first layer is included in the first set of layers: and outputting an encoded bitstream comprising the multi-layer video data.

23. The method of claim 22 further comprising:

generating, for inclusion in the video parameter set, an additional one-bit layerID included flag for each layer ID value between one and the maximum layer ID value, wherein a value for each additional one-bit layerID included flag indicates whether a layer associated with a respective layer ID value is included in the set of layers.

24. The method of claim 22, wherein a first value for the one-bit layerID included flag indicates the first layer is included in the set of layers and a second value for the one-bit layerID included flag indicates the first layer is not included in the set of layers.

25. The method of claim 22, wherein the first set of layers comprises an operation point.

26. The method of claim 22, wherein the method is performed by a video encoder.

27. A video coding device, the device comprising: a memory configured to store the multi-layer video data; and one or more processors configured to determine, for the multi-layer video data, a set of layers, wherein the set of layers corresponds to at least one independently decodable bitstream of the multi-layer video data and comprises two or more layers; generate, for inclusion in a video parameter set, a syntax element specifying a maximum layer identification (ID) value for any NAL units associated with a first set of layers, wherein the multi-layer video data comprises two or more sets of layers, wherein each of the two or more sets of layers is associated with at least one independently decodable bitstream of the video data and comprises two or more layers: generate, for inclusion in the video parameter set, a one-bit layerID included flag for a first layer with a layer ID value less than the maximum layer ID value, wherein a value for the one-bit layerID included flag signals whether the first layer is included in the first set of layers: and outputting an encoded bitstream comprising the multi-layer video data.

28. The video coding device of claim 27, wherein the video encoder is further configured to generate, for inclusion in the video parameter set, an additional one-bit layerID included flag for each layer ID value between one and the maximum layer ID value, wherein a value for each additional one-bit layerID included flag indicates whether a layer associated with a respective layer ID value is included in the set of layers.

29. The video coding device of claim 27, wherein a first value for the one-bit layerID included flag indicates the first layer is included in the set of layers and a second value for the one-bit layerID included flag indicates the first layer is not included in the set of layers.

30. The video coding device of claim 27, wherein the first set of layers comprises an operation point.

31. The video coding device of claim 27, wherein the method is performed by a video encoder.

32. The method of claim 1, wherein the video parameter set includes syntax that applies to multiple layers.

33. The method of claim 1, wherein the syntax element specifying the maximum layer ID value and the one-bit layerID included flag are each fixed length and non-entropy encoded syntax elements.

34. The device of claim 6, wherein the video parameter set includes syntax that applies to multiple layers.

35. The device of claim 6, wherein the syntax element specifying the maximum layer ID value and the one-bit layerID included flag are each fixed length and non-entropy encoded syntax elements.

36. The apparatus of claim 12, wherein the video parameter set includes syntax that applies to multiple layers.

37. The apparatus of claim 12, wherein the syntax element specifying the maximum layer ID value and the one-bit layerID included flag are each fixed length and non-entropy encoded syntax elements.

38. The non-transitory, computer readable storage medium of claim 12, wherein the video parameter set includes syntax that applies to multiple layers.

39. The non-transitory, computer readable storage medium of claim 12, wherein the syntax element specifying the maximum layer ID value and the one-bit layerID included flag are each fixed length and non-entropy encoded syntax elements.

40. The method of claim 22, wherein the video parameter set includes syntax that applies to multiple layers.

41. The method of claim 22, wherein the syntax element specifying the maximum layer ID value and the one-bit layerID included flag are each fixed length and non-entropy encoded syntax elements.

42. The device of claim 27, wherein the video parameter set includes syntax that applies to multiple layers.

43. The device of claim 27, wherein the syntax element specifying the maximum layer ID value and the one-bit layerID included flag are each fixed length and non-entropy encoded syntax elements.

* * * * *

UNITED STATES PATENT AND TRADEMARK OFFICE
CERTIFICATE OF CORRECTION

PATENT NO.       : 9,781,413 B2
APPLICATION NO.  : 14/042416
DATED            : October 3, 2017
INVENTOR(S)      : Ye-Kui Wang Page 1 of 1

It is certified that error appears in the above-identified patent and that said Letters Patent is hereby corrected as shown below:

In the Claims

Column 33, Line 2, Claim 38: replace "claim 12" with -- claim 17 --
Column 33, Line 5, Claim 39: replace "claim 12" with -- claim 17 --

Signed and Sealed this
Twenty-seventh Day of February, 2018

Andrei Iancu
*Director of the United States Patent and Trademark Office*